United States Patent Office 2,965,582
Patented Dec. 20, 1960

2,965,582
METHOD OF PREPARING A GASOLINE ADDITIVE CONTAINING A BORON COMPOUND AND TETRAETHYL LEAD FLUID

Naima Visnapuu, Cleveland Heights, Ohio, assignor to The Standard Oil Company, Cleveland, Ohio, a corporation of Ohio No Drawing. Filed Sept. 13, 1957, Ser. No. 683,684

4 Claims. (Cl. 252—386)

This invention relates to a novel method of preparing boron compounds and compositions containing the same for incorporating into liquid motor fuels, which consists of blending the reaction product derived from boric acid and a glycol from a class hereinafter described in a tetraethyl lead fluid.

Patent No. 2,741,548, granted to my co-associates and assigned to my assignee, discloses gasolines containing organic compounds of boron which are effective in modifying the actions of these fuels in internal combustion engines. These boron compounds are characterized as having 3 to 25 carbon atoms and the following formula:

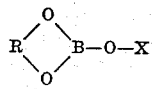

where X is selected from the group consisting of hydrogen,

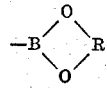

and

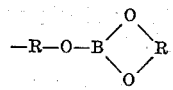

and where R is selected from the group consisting of alpha and beta alkylene radicals having 3 to 20 carbon atoms.

This group of boron compounds may be prepared by reacting boric acid with the corresponding alpha glycol having the formula:

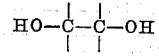

or the beta glycol having the formula:

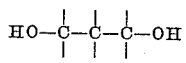

in which formulae the unattached valences are linked to hydrogen or to the straight chain or branched alkyl radicals to provide a total of 3 to 20 carbon atoms in the glycol.

In addition to the boron compounds disclosed in the above patent, another type of boron compound for use as a gasoline additive can be formed by the reaction between 2 moles of a glycol from the class previously described and 1 mole of boric acid. The exact configuration for such compounds is not known with certainty, but they are believed to be chelate-type compounds of the following general formula:

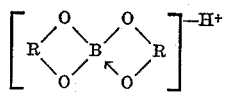

The gasoline stocks to which these boron compounds are added may be any of those conventionally used in making motor gasoline today. These gasolines contain tetraethyl lead (TEL) in amounts from ½ cc. per gallon of gasoline and a halide scavenger. The latter may comprise "motor mix," by which is meant one theory of ethylene dichloride and ½ theory of ethylene dibromide, or "aviation mix," by which is meant one theory of ethylene dibromide. Reference to "MM" or "AM" hereinafter is intended to refer to TEL and a scavenger of the type and in the amount just stated. Other mixtures of the halides, such as "Motor Plus," can be used. "By theory" is meant the stoichiometric amount of the ethylene dihalide for combination with all of the lead as lead halide.

Invariably, water of reaction is formed during the preparation of all of these boron compounds from boric acid and glycols of the class previously defined. The reaction of 2-methyl 2,4-pentanediol with boric acid in a 1:1 molar relation is exemplary of this circumstance. This reaction proceeds readily upon the simple addition of heat, and at approximately 70 to 75° C. the mixture becomes completely liquid. The reaction proceeds as follows:

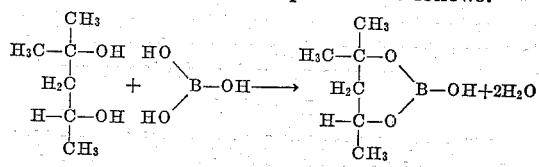

The water of reaction formed must be removed before the boron compound is added to gasolines. However, difficulty is encountered when attempting to separate the water of reaction from the boron reaction mixture by inexpensive means, such as simple boiling. This is due to the fact that the vapor pressures of many of these boron compounds would be increased by the heating to a point where considerable amounts of product would be lost during the removal of the water. Of course, it is possible to reduce these losses of product during separation of the water by using fractional distillation or azeotropic fractional distillation, but the processing costs become more expensive. Therefore, the purpose of this invention is to provide a method of removing water of reaction from the boron reaction mixture by a simple and inexpensive means.

My method consists of combining the crude reaction product derived from boric acid with a glycol from the class described above with quantities of a TEL fluid. Boric oxide is to be considered an equivalent of boric acid in the foregoing reactions, with only the requirement for making the appropriate weight adjustment in order to maintain the same molar relationship with the glycol.

Due to the low solubility characteristics between TEL and water when the crude reaction product of boric acid and the glycol are blended together with the TEL fluid, the water of reaction which is present in the crude reaction product forms a separate water layer which can be easily withdrawn.

Therefore, it is the object of this invention to provide a simple and inexpensive method of removing the water of reaction from the reaction product derived from boric acid and a glycol of the class defined by blending the reaction product with TEL fluid and withdrawing the separated water layer so the resulting product may be conveniently blended without further processing in gasolines.

Once the insoluble water layer is removed, the remaining TEL fluid containing the boron compound is ready for blending with gasoline. The amount of TEL fluid that is added to the boron reaction mixture can be chosen so that after the water is removed, the remaining blend will be in the proportion of boron compound to TEL that is desired for the fuel sold in commerce.

The principle of my invention will be illustrated from the following examples in which the reaction product is formed by reacting dry boric acid with 2-methyl 2,4-pentanediol in a 1:1 molar ratio. The reaction will proceed according to the equation expressed before.

*Example 1*

1,212 gms. of 2-methyl 2,4-pentanediol was added to 0.635 gm. of anhydrous boric acid and the mixture heated to a temperature of 70° C., whereupon boric acid completely dissolved. 4.5 cc. of TEL fluid with MM was then added and a water layer separated immediately. The sample was stored at room temperature and the water remained in the separate layer. The water was separated by decantation, and the solution of the boron compound in the TEL fluid was ready for addition to gasoline in the proportion of boron compound to TEL desired for a commercial gasoline.

*Example 2*

1.209 gms. of 2-methyl 2,4-pentanediol was added to 0.633 gm. of boric acid, and the procedure of Example 1 was repeated. 4.5 cc. of tetraethyl lead with AM was then added and a water layer separated immediately. The sample was stored at room temperature and the water remained in the separate layer. The procedure of Example 1 was then followed to remove the water, and the remaining mixture was ready for addition to gasoline.

*Example 3*

1.2140 gms. of 2-methyl 2,4-pentanediol was added to 0.6375 gm. of boric acid, and the mixture was heated as in Example 1 until the boric acid dissolved. Upon cooling, a solid product was formed. Then 5.0 cc. of TEL with MM was added and the mixture heated to a temperature of 70° C., whereupon the mixture became liquid and a water layer separated immediately. The sample was allowed to stand at room temperature without any change in the separated water layer, and the water was separated by decanting as described before, leaving a mixture ready for addition to gasoline.

*Example 4*

1.2129 gms. of 2-methyl 2,4-pentanediol was added to 0.635 gm. of boric acid, and the mixture was heated until the boric acid dissolved. Upon cooling, a solid product was formed. 4.5 cc. of TEL with AM was added and the mixture heated as in Example 3 upon which a water layer separated immediately. The sample was allowed to stand at room temperature without any change in the separated water layer. The water layer was decanted as before, leaving a mixture ready for addition to gasoline.

The examples above for 2-methyl 2,4-pentanediol are characteristic for reaction mixtures using other glycols from the group described hereinbefore. The molar ratio of the amount of glycol to boric acid may be varied from 1:1 to 2:1 or mixtures in between. In all instances, water of reaction can be removed in the same manner as illustrated above.

It is unobvious and advantageous that the boron compound is sufficiently soluble in TEL fluid and that water of reaction can be separated as described. It is especially advantageous because the boron compound, according to the cited patent, is added only to a gasoline containing TEL fluid. Therefore, it is necessary to add both the boron compound and TEL fluid to gasoline, and my invention makes it possible not only to form the boron compound readily but to add it to the gasoline in a single step with the TEL fluid, thereby effecting savings in metering and blending equipment.

I claim:

1. A method of preparing a gasoline additive comprising tetraethyl lead fluid and an organic boron compound consisting of the steps of mixing and heating boric acid with a glycol in a molar ratio of from 1:1 to 1:2, said glycol having the formula:

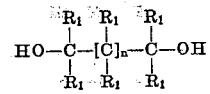

wherein $n$ is a number selected from the group consisting of 0 and 1 and $R_1$ is a member of the group consisting of hydrogen and alkyl groups to provide a total of from 3 to 20 carbon atoms in said glycol to form a liquid mixture including the water formed by the reaction of the glycol with the boric acid, mixing an amount of tetraethyl lead fluid with said mixture to separate the water of reaction as a separate phase, and decanting the separated water phase to leave a mixture of tetraethyl lead fluid and an organic boron compound ready for addition to gasoline.

2. The method of claim 1 in which the glycol is 2-methyl 2,4-pentanediol.

3. The method of claim 1 in which the tetraethyl lead fluid contains one theory of ethylene dichloride and one-half theory of ethylene dibromide per theory of tetraethyl lead.

4. The method of claim 1 in which the tetraethyl lead fluid contains one theory of ethylene dibromide per theory of tetraethyl lead.

References Cited in the file of this patent

UNITED STATES PATENTS

| | | |
|---|---|---|
| 2,710,251 | Darling | June 7, 1955 |
| 2,720,449 | Arimoto | Oct. 11, 1955 |
| 2,741,548 | Darling et al. | Apr. 10, 1956 |
| 2,839,564 | Garner | June 17, 1958 |